Aug. 11, 1970          L. R. KUBECKA          3,523,586
                       GROUND CONDITIONER
Filed Sept. 6, 1967                          4 Sheets-Sheet 1
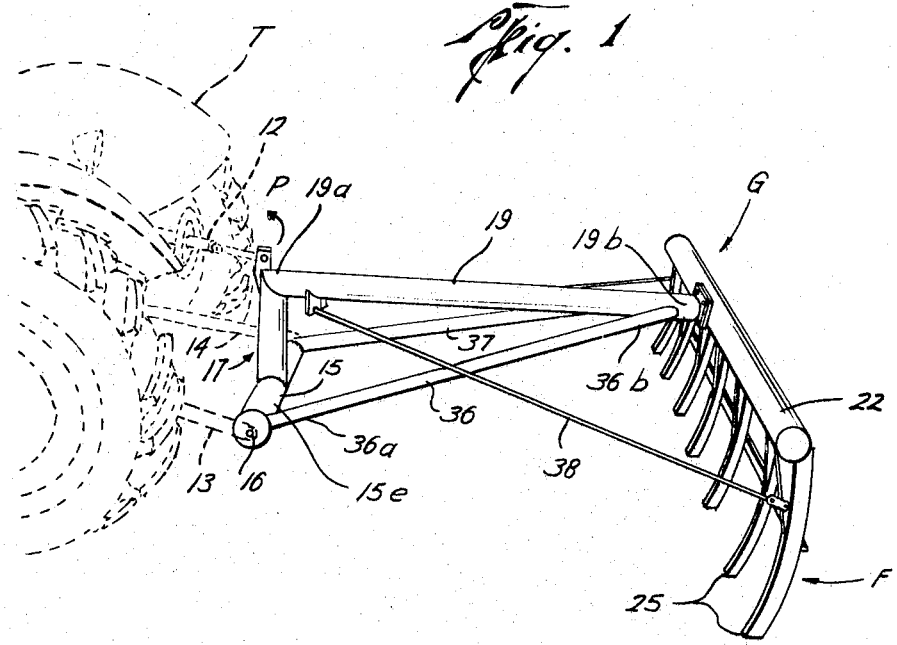
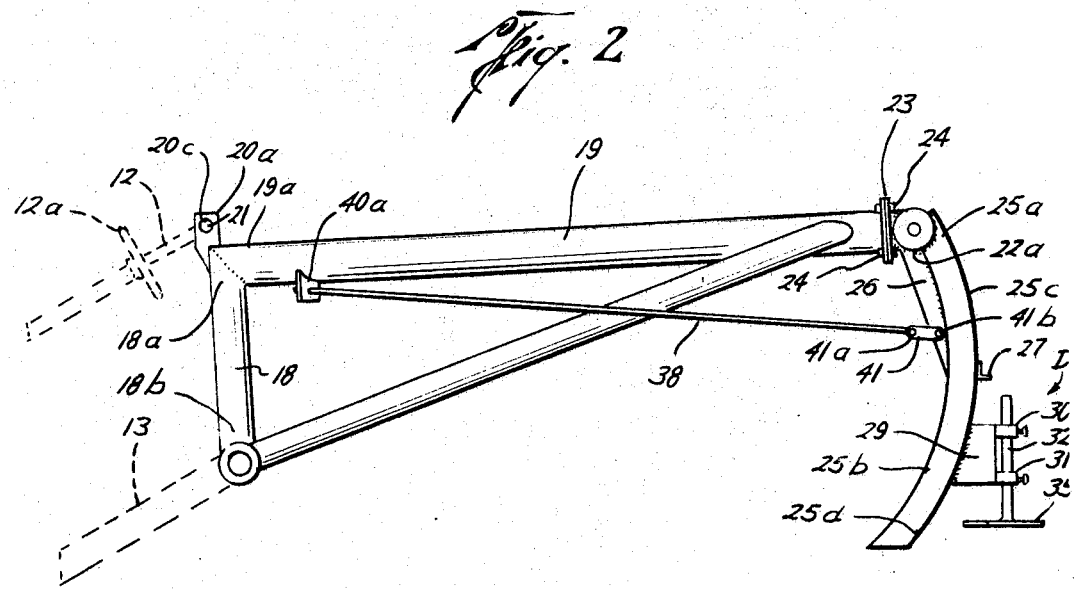
Lee Roy Kubecka
INVENTOR.
BY Hayden & Pravel
ATTORNEYS

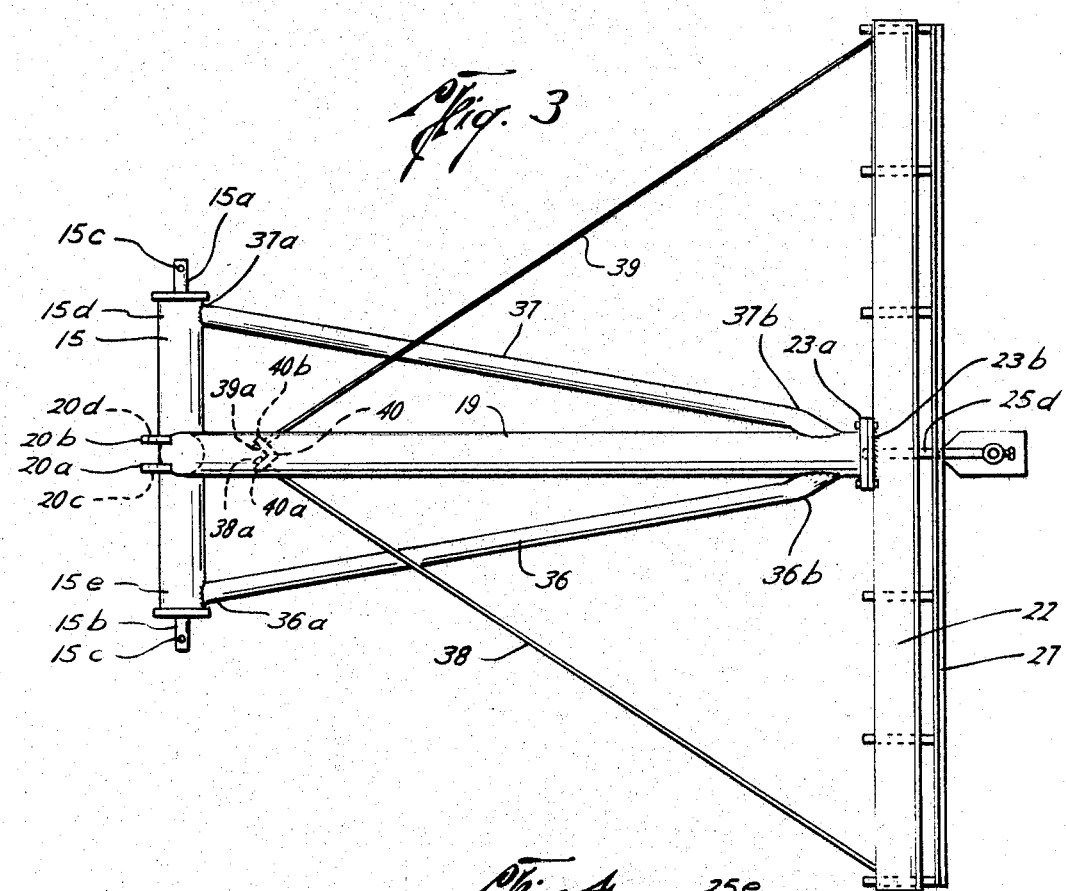
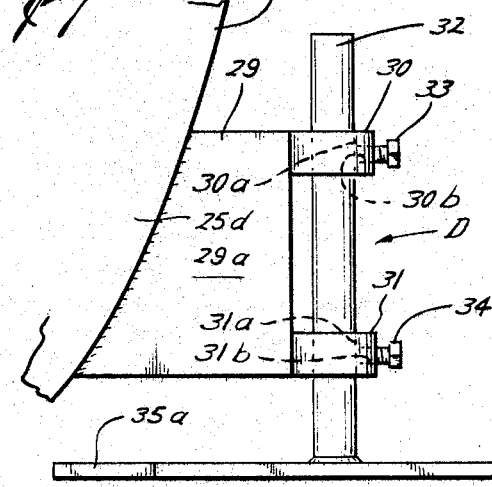
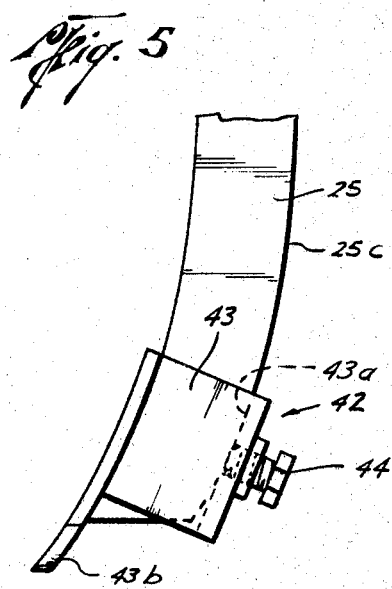

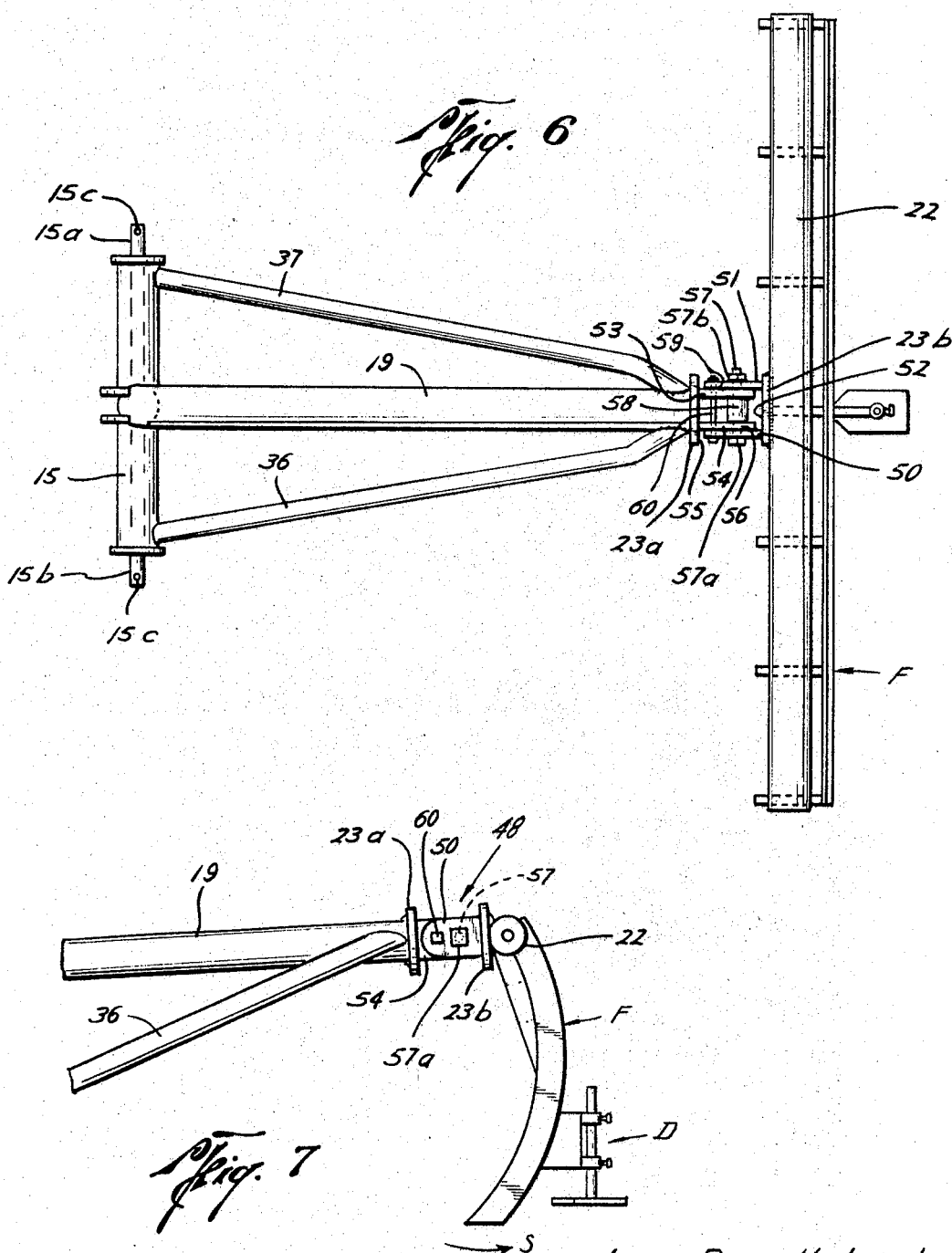

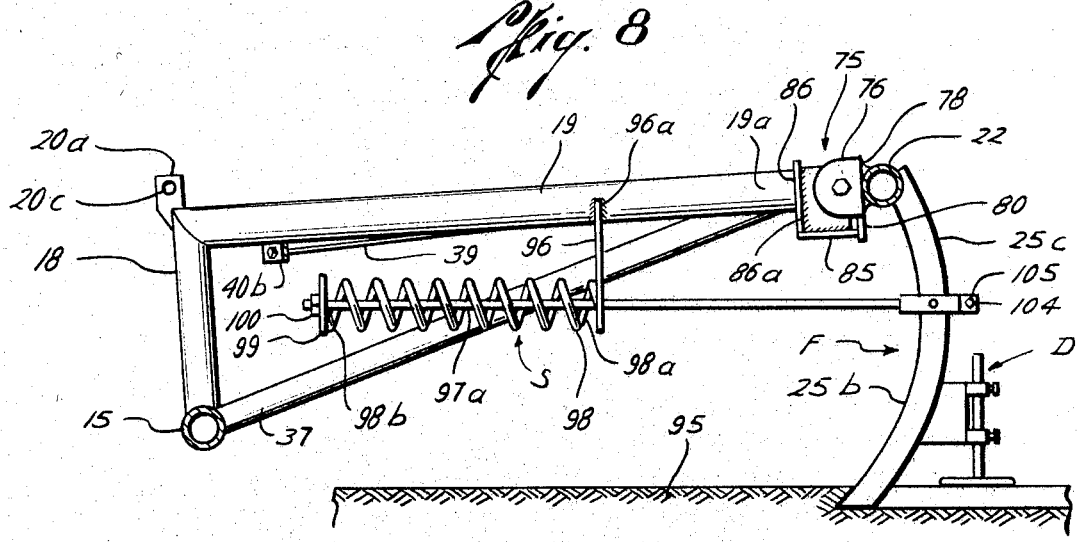
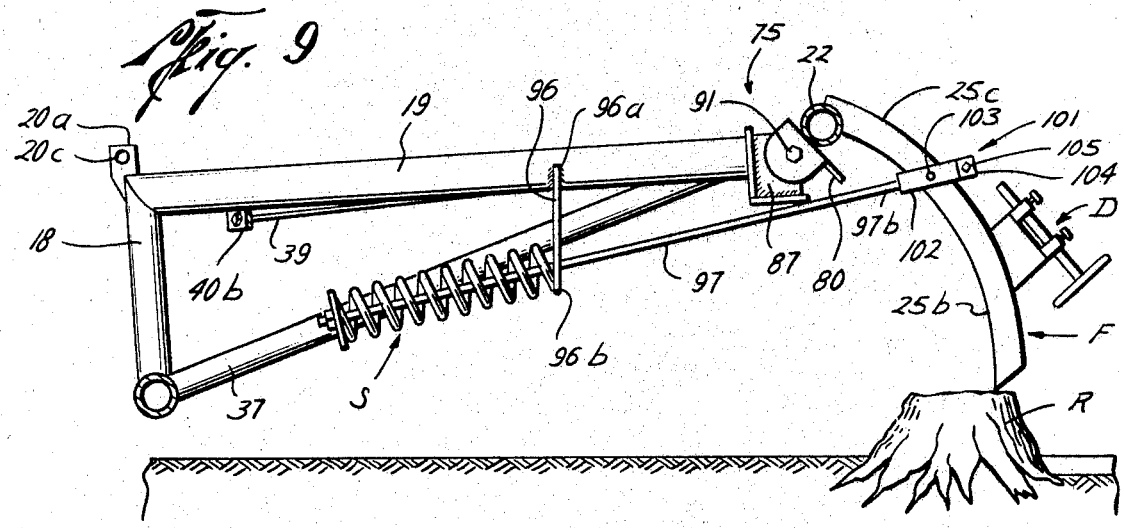
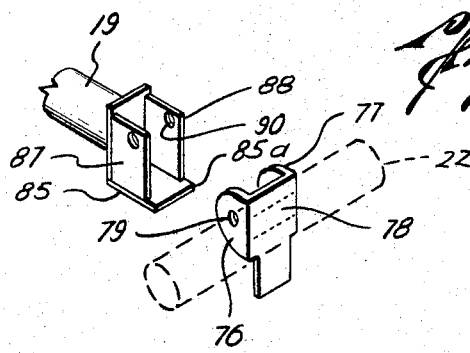
Lee R. Kubecka
INVENTOR.
BY Hayden & Pravel
ATTORNEYS

United States Patent Office 3,523,586
Patented Aug. 11, 1970

3,523,586
GROUND CONDITIONER
Lee R. Kubecka, 1814 Parana, Houston, Tex. 77055
Filed Sept. 6, 1967, Ser. No. 667,050
Int. Cl. A01b 13/08
U.S. Cl. 172—699  7 Claims

ABSTRACT OF THE DISCLOSURE

A device for conditioning ground by removing roots and the like from the ground as the device is pulled by a tractor. In two embodiments, a plurality of fingers and finger bars is permitted to pivot about a pull bar after an excessive load is placed on the fingers to thereby prevent breaking or damage to the fingers.

BACKGROUND OF THE INVENTION

Field of the invention

This invention relates to a new and improved device for clearing and conditioning land for crops and the like.

Description of the prior art

In many areas of the United States, land that was at one time heavily wooded is now being cleared to enable the land to be used for agrarian or urban purposes. Although suitable equipment has been available for cutting trees and otherwise clearing the land from the earth's surface upwardly, heretofore, a suitable means has been lacking for readily pulling and removing roots and other undesirable growths below the surface of the land.

SUMMARY OF THE INVENTION

Briefly, the present invention relates to a ground conditioner adapted to be pulled by a tractor for removing roots and the like from the ground by a plurality of spaced, rigid fingers which is pulled through the ground. The ground conditioner is secured to the tractor in a new and improved manner and has mounted therewith a depth control unit which is centrally mounted for controlling the depth at which all of the spaced fingers are pulled through the ground.

It is an object of the present invention to provide a new and improved ground conditioner device for attachment to a tractor or similar standard equipment for pulling roots and other growths which are disposed below the surface of the ground so as to either remove such roots or growths or loosen same for subsequent removal or distribution.

Another object of this invention is to provide a new and improved ground conditioner having means for controlling the depth of penetration of fingers thereof in the ground when pulling roots or otherwise conditioning the soil, whereby adequate pulling forces may be developed without permitting the fingers to become overloaded by penetrating the ground to an excessive depth.

The preferred embodiment of this invention will be described hereinafter together with other features thereof, and additional objects will become evident from such description.

BRIEF DESCRIPTION OF THE DRAWINGS

FIG. 1 is an over-all perspective view of the present invention secured to a tractor;

FIG. 2 is a side view of the present invention secured to a turnbuckle and straps of a tractor;

FIG. 3 is a top view of the present invention;

FIG. 4 is a partial view of the present invention illustrating in detail the depth control unit;

FIG. 5 is a partial view of the present invention illustrating in detail a harrow point tooth attachment;

FIG. 6 is a partial top view illustrating in detail a second embodiment for a detachable flange mounting of the present invention;

FIG. 7 is a partial side view further illustrating the second embodiment of the present invention;

FIG. 8 is a side view partly in section illustrating in detail the preferred embodiment for a pivotal arrangement for a pivotal arrangement of the present invention;

FIG. 9 is a partial side view similar to FIG. 8 illustrating the operation of the pivotal arrangement of the present invention; and FIG. 10 is a perspective view partly in section of the pivotal flange arrangement of the present invention.

DESCRIPTION OF THE PREFERRED EMBODIMENTS

Briefly, the present invention relates to a ground conditioner G adapted to be pulled by a tractor T for removing roots and the like from the ground by a plurality of spaced, rigid fingers F which is pulled through the ground. The ground conditioner G is secured to the tractor T in a new and improved manner and has mounted therewith a depth control unit D which is centrally mounted for controlling the depth at which all of the spaced fingers F are pulled through the ground.

As illustrated in FIG. 1, a turnbuckle 12 and spaced parallel straps 13 and 14 extend outwardly from the back of the tractor T or other suitable pulling device to provide the usual three-point tractor hookup. The spaced metal straps 13 and 14 are adapted to be positioned in a lower or first position such as illustrated in FIG. 1 adjacent the ground and may be hydraulically lifted or raised with the usual tractor hydraulic lift to a second or upper position as illustrated in FIG. 2. As will be understood by those skilled in the art, the turnbuckle 12 swings on its pivoted mounting from a first position (FIG. 1) to a second or upper position (FIG. 2) when the straps 13 and 14 are lifted upwardly. A wheel or turning guide 12a is preferably mounted with the turnbuckle 12 for convenience in rotating the turnbuckle 12 to longitudinally adjust its length.

The ground conditioner G of this invention includes an attachment bar 15 which is mounted transversely between and is pivotally secured to the spaced straps 13 and 14. The bar 15 is secured to the straps by a pair of longitudinally extending pivot pins 15a and 15b which is pivotally and releasably connected with the bar 15 and which is adapted to extend through openings 16 in the straps. Each of the pivot pins 15a and 15b has an opening 15c near its outer end for receiving a cotter key or other removable locking pin (not shown).

A pull bar 19, which extends rearwardly from the tractor T, is secured at its forward end 19a to an upper end 18a of an upright post 18 by any suitable means such as welding. Secured to each of the ends 18a and 19a and on each side thereof is a pair of turnbuckle connections 20a and 20b which is provided with openings 20c and 20d, respectively. The rearward end of the turnbuckle 12 is adapted to be inserted between the connections 20a and 20b and secured thereto by a connecting pin 21 which is adapted to be inserted through the openings and an eye or opening (not shown) in the end of the turnbuckle for securing the rearward end 19a of the pull bar 19 to the turnbuckle.

As illustrated in FIGS. 1 and 2, the upright post 18 extends downwardly from the end 18a to terminate in an end 18b which is secured to the upper surface of the attachment bar 15. It should be understood that the upright post 18 and pull bar 19, while illustrated as being two separate pieces, are adapted to be integrally constructed to form one piece.

The rear end 19b of the pull bar 19 is secured to a transversely positioned finger bar 22 by a detachable flange mounting 23. A flange plate 23a is secured to the end of the bar 19 and a flange plate 23b is secured substantially in the center of the finger bar 22 and is positioned to face and abut the other flange plate 23a. Means such as a plurality of nuts and bolts 24 are provided for removably securing the flange plates 23a and 23b together. The finger bar 22 is positioned transversely to the pull bar 19 and parallel to the attachement bar 15. A plurality of spaced, parallel rigid fingers 25 preferably formed of steel is secured at one end 25a to the finger bar 22 by any suitable means, such as welding. The fingers 25 extend downwardly from the finger bar 22 to enter and penetrate the ground and are provided with an arcuately curved surface 25b which slants or curves toward the tractor T. A plurality of finger ribs 26 is welded or is otherwise secured to the under surface 22a of the finger bar 22 and to the upper portion of each curved surface 25b for providing added support to the fingers 25 as they are pulled through the ground. It should be noted that a brace member 27 is welded or otherwise secured transversely to each of the fingers on the back surface 25c thereof for adding further support and to enable the fingers 25 to remain rigidly fixed and spaced.

A depth control unit D as illustrated in FIGS. 2 and 4 is provided for controlling the depth at which all of the fingers 25 are pulled through the ground. The depth control unit D includes a rib 29 secured to the back surface 25c adjacent a lower end 25d of an intermediate finger 25e, which should be disposed at the center or mid-point of the bar 22. The rib 29, which extends outwardly from finger 25e, has secured at the upper and lower portions of the outermost end 29a (FIG. 4) a pair of foot rod sleeves or attaching brackets 30 and 31. The foot rod sleeves 30 and 31 are preferably circular or elliptical in shape and include openings 30a and 31a, respectively, for receiving a foot rod 32.

The foot rod 32 extends vertically or uprightly through each of the openings 30a and 31a and is adapted to be positioned and held in place by a pair of lock bolts or screws 33 and 34 which is inserted into threaded openings 30b and 31b, respectively. The lock bolts 33 and 34 may be threaded into the openings 30b and 31b until the lock bolts tightly engage the foot rod 32 to prevent slippage thereof. Mounted with the lower end of the foot rod 32 is a flat foot or plate 35 having a pointed end 35a facing the tractor T. The foot 35 is positioned horizontally relative to the ground to contact and engage the ground as will be more evident hereinafter.

A pair of rigid braces 36 and 37 is provided to aid in supporting the pull bar 19 and attachment bar 15. The rigid brace 36 is secured at one end 36a adjacent the outer end 15e of the bar 15 and at the other end 36b to the rear end 19b of the pull bar 19. Similarly, rigid brace 37 is secured at each end 37a and 37b adjacent the ends 15d and 19b of the bars 15 and 19, respectively. A pair of removable braces 38 and 39 is also provided for providing added support to the ground conditioner. Removable braces 38 and 39 are secured adjacent forward end 19a to an angle-iron retainer 40 which is welded or otherwise secured to the under surface of the bar 19. The retainer 40 has sections 40a and 40b (FIG. 3) each of which has a hole (not shown) for receiving one end of each of the braces 38 and 39, respectively. Retainer nuts 38a and 39a are threaded on the ends of the braces 38 and 39 to retain them in position at the retainer 40. As illustrated in FIGS. 1, 2, and 3, each of the braces 38 and 39 is secured to the outer most rib 26 on each of the respective sides by rib straps 41 which are secured to each of the braces 38 and 39 and the outermost ribs 26, respectively, by a plurality of nuts and bolts 41a and 41b.

In the operation of the invention, the ground conditioner G is mounted with the tractor T (FIG. 1) by securing the turnbuckle 12 to the turnbuckle connections 20a and 20b and by inserting the pivot pins 15a and 15b through holes 16 in each of the tractor straps 13 and 14, respectively. In this position, the tractor straps 13 and 14 and attachment bar 15 are in the lowermost or first position so that the fingers 25 will be pulled through the ground at a proper angle.

After mounting the ground conditioner G with the tractor T, the depth control unit D is adjusted to control the depth at which the fingers 25 are pulled through the ground to prevent the fingers from becoming broken or bending because of too much of a pulling load or weight on the fingers. To adjust the depth control unit D, screws 33 and 34 are loosened to permit the foot rod 32 to be moved upwardly or downwardly relative to the sleeve 30 and 31. Of course, the movement of the foot rod 32 also moves the foot or plate 35. As the tractor 35 contacts and rides or slides therealong; and since the lower end 25d of the fingers 25 is below the level of plate 35, the fingers are pulled through the ground at a predetermined level and are provided from burrowing further therein. Also, because the depth control unit D is secured to an intermediate, centermost finger, the depth at which the fingers are pulled through the ground remains stabilized even if the ground conditioner G is pulled over uneven ground.

As the fingers 25 are pulled through the ground, they rip, tear, and pull up roots in their path; and as the roots are removed, the roots are retained by and are stacked up around the area of the fingers 25. When a sufficient stack of roots has been gathered, the ground conditioner G is lifted from the first position (FIG. 1) to the second or higher position (FIG. 2).

The position of the post 18 and pull bar 19 enables the fingers 25 to be lifted to a maximum height so that the fingers 25 will clear a stack of roots to enable the ground conditioner G to be removed from the stack and be prepared again for use. As illustrated in FIG. 1, the pull bar 19 is substantially parallel to the ground and the turnbuckle 12 is longitudinally aligned with the pull bar 19. The upright post 18 depends from the bar 19 and enables the tractor straps 13 and 14 to be positioned adjacent the ground. Thus, when the straps 13 and 14 are hydraulically lifted in the usual manner, the turnbuckle 12 immediately arcuately pivots toward the tractor T as depicted by the arrow P. Further, the position of the post 18 and pulling bar 19 also enables the fingers 25 to be immediately lifted upwardly when the tractor straps 13 and 14 are hydraulically lifted which thereby produces a maximum lift of the fingers 25.

When the ground conditioner G has been lifted to its maximum height, it is in the position as illustrated in FIG. 2 which is the second or lifted position. In the second position, the pull bar 19 is lifted and is nearer the tractor T than when in the first position due to the arcuate travel of the turnbuckle 12 toward the tractor T. It should be noted that the arcuate travel of the turnbuckle 12 toward the tractor T also causes the rearward end of the ground conditioner G to arcuately swing upwardly which lifts the fingers 25 even more above the stacked roots. It should also be noted that in the second or lifted position the post 18 is inclined more toward the tractor than in the first position.

After the fingers 25 have been lifted above the roots and the ground conditioner G has been removed from the roots therebeneath, the ground conditioner G is thereafter lowered to the first position for continued root removing operations.

After use of the ground conditioner G has been completed, the means, such as nuts and bolts 24, are removed from the flange plates 23a and 23b which separate the pull bar 19 from the finger bar 22 and the fingers 25 to enable the rearward end 19b of the pull bar 19 to be used as a lifting boom, hoist, or partial lifting boom or hoist so that the finger bar 22 and fingers 25 can be positioned on a platform, such as a truck bed and the like for easy removal thereof.

As illustrated in FIG. 5, a harrow point tooth attachment 42 is provided for attaching to the lower end 25d of each of the fingers 25. An enclosure body 43 of the attachment 42 is adapted to be positioned on the lower end 25d and is provided with an opening 43a through which the finger 25 is inserted. When the attachment 42 is positioned as desired, a lock bolt 44 which is mounted with attachment 42 is threadedly rotated to contact the back surface 25c to enable the attachment 42 to be locked and secured on finger 25. The attachment 42 is shaped at one end thereof to form a harrow point 43b adjacent curved surface 25b and below the lower end 25d so that the harrow point 43b is pulled through the ground. The harrow point 43b is used to cut and tear apart the roots and grasses, such as bermuda grasses, to help the spreading and developing of these grasses.

As illustrated in FIGS. 6 and 7, another embodiment is illustrated wherein the parts which are the same as those in FIGS. 1–5 bear like letters and/or numerals. The flange mounting 23 of FIGS. 6 and 7 includes a safety means 48 which releasably mounts the fingers 25 so that they may pivot if roots and the like engaged thereby provide too much resistance. The safety means 48 thereby prevents the fingers 25 from bending or becoming broken in the event the load on the fingers becomes excessive as the conditioner G is pulled.

A pair of tabs 50 and 51 is secured to the front face 52 of the flange plate 23b adjacent each side thereof and extends toward pull bar 19. A second pair of tabs 53 and 54 is secured to the front face 55 of flange plate 23a and is positioned on the inside of the outermost tabs 50 and 51 to extend toward face 52 of plate 23b. A plurality of holes 56 extends through each of the tabs and when aligned is adapted to receive a pivot bolt 57. The pivot bolt 57 has a head 57a at one end thereof and a retainer nut 57b at the other end for retaining the pivot bolt in the aligned openings 56. As illustrated in FIGS. 6 and 7, a spacer 58 is positioned between tabs 53 and 54 and is positioned circumferentially around the bolt 57. A plurality of aligned shear pin holes 59 is provided in the tabs 50, 51, 53, and 54 for receiving a shear pin 60 which operates in a manner to be described hereafter.

As the fingers 25 are pulled through the ground, they may engage roots and the like which refuse to break or loosen, thus placing a load on the fingers 25 which is in excess of the predetermined force required to sever the shear pin 60. If the roots thus engaged provide a sufficient force or resistance to shear the pin 60, the finger bar 22, tabs 50 and 51, and fingers 25 pivot around the pivot bolt 57, as illustrated by the arrow S (FIG. 7). Therefore, fingers 25 pivot outwardly and upwardly to thereby slide or lift over the roots and the like. The shear pin 60 is then replaced with a new shear pin 60 to resume operations in other areas, it being understood that the shear force for severing the pin 60 will be predetermined so that it does not shear under normal operating conditions and loads.

The flange mounting 23, as illustrated in FIGS. 6 and 7, may also be disassembled by removing the pivot bolt 57 and shear pin 60 from openings 56 and 59, respectively, to enable the pull bar 19 to be used as a lifting boom or partial lifting boom for loading the finger bar 22 and fingers 25 on a platform.

As illustrated in FIGS. 8, 9 and 10, another embodiment is illustrated wherein the parts which are the same as those in FIGS. 1 to 7 bear like letters and/or numerals. The flange mounting 23 of FIGS. 1 through 7 has been repaced by a pivotal arrangement or means generally designated at 75 for enabling the fingers 25 to pivot by overcoming a spring means S if roots and the like engaged thereby provide too much resistance. The pivotal means 75 thereby prevents the fingers 25 from bending or becoming broken in the event the load on the fingers becomes excessive as the conditioner G is pulled.

A pair of tabs 76 and 77 extends outwardly from a finger bar attachment 78 which is secured by any suitable means such as welding to the finger bar 22. Secured with the finger bar member or attachment 78 is a downwardly extending tab 80 which normally abuts a lower transverse lip 85 of a tab attachment member 86. The outwardly, parallel extending tabs 76 and 77 are arcuately curved at their outer ends and include aligned openings 79.

Tab attachment member 86 includes outwardly parallel extending tabs 87 and 88 which are secured by the plate 86a to the end 19a of the pull bar 19, and as illustrated, the lip 85 is secured transversely to plate 86a.

As illustrated in FIGS. 8, 9 and 10, openings 90 are provided for alignment with the holes 79 in each of the tabs 76 and 77 to enable the finger bar 22 and fingers 25 to be pivotally secured with the pull bar 19 by means of a pivot pin 91 which is passed or inserted through each of the openings 79 and 90 of each of the tabs 76, 77, 87, and 88 after alignment of the respective openings. As illustrated in FIG. 10, openings 90 are off center of each of the tabs 87 and 88 to insure that pivoting of the fingers 25 and finger bar 22 about the pull bar 19 will not cause the tabs 76 and 77 to engage the plate 86a welded or secured with the finger bar 19.

The transverse lip 85 includes an extension lip 85a for continually engaging the downwardly extending member 80 as the ground conditioner G is pulled through the ground as illustrated at 95 and to prevent the fingers 25 from pivoting inwardly toward the pull bar 19.

An arm 96 is connected at one end 96a by any suitable means such as welding to the pull bar 19 and extends downwardly therefrom. A spring bar 97 extends through an opening (not shown) in the other end 96b of the arm 96 and concentrically receives on one end 97a thereof a coiled spring member 98. Spring member 98 abuts the lower end 96b of the arm 96 at one end 98a thereof and is retained concentrically around the bar 97 by a retainer plate 99 which is secured with the bar 97 by a retainer bolt 100 to prevent the end 98b of the spring from slipping off the bar 97. Thus, as illustrated in FIGS. 8 and 9, the spring member 98 is retained between the arm 96 and plate 99 and concentrically around the bar 97.

The bar 97 is secured at its other end 97b to a finger attachment unit designated generally at 101 which inclues parallel arms 102 mounted with substantially the central finger 25 by a suitable pivot pin 103. The unit 101 further includes a brace 104 which receives a tightening bolt 105 for enabling the unit 101 to be securely tightened to the substantially central finger 25. It is, of course, to be understood that the end 97b of the bar 97 is secured with a front brace (not shown) of the unit 101 which brace is secured at one of each or the ends thereof with the parallel arms 102.

As the fingers 25 pull through the ground, they may engage roots and the like which refuse to break or loosen, thus placing a load on the fingers 25 which may either break or bend the fingers. If the fingers 25 engage roots R with a sufficient force to thus overcome the spring member 98 which normally retains the fingers 25 in the position as illustrated in FIG. 8, the roots R (FIG. 9) while engaging the fingers 25 provide a sufficient force to overcome the spring means 98 and to enable the fingers 25 to pivot about the pivot pin 91 as illustrated in FIG. 9. The fingers 25 pivot outwardly and upwardly to thereby slide or lift over the roots and the like. It should be understood that the force required to overcome the spring member 98 is predetermined so that the fingers 25 do not pivot under normal operating conditions and loads.

The pivotal means 75 may also be disassembeld by removing the pivot pin 91 and by disengaging the bar 97 from the arm 96 by removing the retainer nut 100 to enable the pull bar 19 to be used as a lifting boom or partial lifting boom for loading the finger bar 22 and fingers 25 on the platform.

The foregoing disclosure and description of the invention are illustrative and explanatory thereof, and various changes in the size, shape, and materials as well as in the details of the illustrated construction may be made within the scope of the appended claims without departing from the spirit of the invention.

What is claimed is:
1. An apparatus adapted to be pulled by a tractor or the like for removing roots and the like from the ground wherein the tractor has lower spaced straps and an upper turnbuckle extending outwardly from the back thereof, comprising:
   (a) a transversely positioned attachment bar secured to and between the straps, said attachment bar and the straps being adapted to pivot from a first position near the ground to a second position thereabove;
   (b) a pull bar extending longitudinally relative to the tractor;
   (c) a substantially vertical post having its lower end connected to the mid-portion of said attachment bar and its upper end connected to the forward end of said pull bar to position the turnbuckle and said pull bar substantially parallel to the ground when said attachment bar is in its first position;
   (d) a finger bar extending transversely to said pull bar and having its mid-portion connected to the near end of said pull bar; and
   (e) a plurality of fingers connected to said finger bar and extending downwardly therefrom to penetrate the ground and remove roots therefrom as said fingers are pulled through the ground.
2. The structure as set forth in claim 1, including:
   (a) each of said fingers has a forward edge which is curved and which is continuous and smooth for engaging under roots while being movable upwardly for disengagement therefrom for dumping the roots.
3. The structure as set forth in claim 1, including:
   (a) a horizontally positioned foot secured to and behind the centermost of said fingers for contacting and engaging the ground as said fingers are pulled through and penetrate the ground to thereby control the depth at which said fingers are pulled through the ground.
4. The structure set forth in claim 1, including:
   (a) a depth control member connected to one of said fingers and disposed rearwardly of said fingers approximately in line with said pull bar.
5. The structure set forth in claim 1, wherein:
said apparatus is free of any means for engaging the ground forwardly of said fingers to provide an area for roots to roll as the fingers are dragged.
6. The structure set forth in claim 4 wherein:
said fingers are spaced apart a sufficient distance for dirt from the roots to pass therethrough above the ground level as the fingers pulled the roots over the ground to avoid pulling any substantial amount of dirt with the roots as the fingers are dragged along.
7. The structure set forth in claim 2, wherein:
said forward edge of each of said fingers is narrow and is of substantially the same width upwardly from the lower end and throughout the area engaging the ground.

References Cited

UNITED STATES PATENTS

| Re. 22,627 | 4/1945 | McKay | 172—450 X |
| 929,539 | 7/1909 | Bateman | 172—271 |
| 1,381,984 | 6/1921 | Gapp | 172—691 |
| 2,649,722 | 8/1953 | Raught | 172—451 X |
| 2,650,533 | 9/1953 | Geiling | 172—691 X |
| 2,731,896 | 1/1956 | Wurster | 172—451 X |
| 2,736,252 | 2/1956 | Latshaw | 172—451 X |
| 2,815,591 | 12/1957 | Mattingly | 172—739 X |
| 2,987,125 | 6/1961 | Singleton | 172—764 X |
| 3,023,819 | 3/1962 | Tanke | 172—764 X |
| 3,085,635 | 4/1963 | Livermore | 172—719 X |
| 3,174,557 | 3/1965 | Newkirk | 172—445 X |
| 3,318,389 | 5/1967 | Kirchner | 172—445 |

FOREIGN PATENTS

| 1,178,929 | 12/1958 | France. |
| 933,898 | 10/1955 | Germany. |
| 779,606 | 7/1957 | Great Britain. |

ROBERT E. PULFREY, Primary Examiner

A. E. KOPECKI, Assistant Examiner

U.S. Cl. X.R.

172—265, 271, 776